United States Patent
Baek et al.

(10) Patent No.: US 8,572,384 B2
(45) Date of Patent: Oct. 29, 2013

(54) METHOD AND APPARATUS FOR UPDATING AN AUTHORIZATION KEY IN A COMMUNICATION SYSTEM

(75) Inventors: YoungKyo Baek, Seoul (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 490 days.

(21) Appl. No.: 12/627,896

(22) Filed: Nov. 30, 2009

(65) Prior Publication Data

US 2011/0096927 A1    Apr. 28, 2011

Related U.S. Application Data

(60) Provisional application No. 61/255,348, filed on Oct. 27, 2009.

(51) Int. Cl.
*H04L 29/00* (2006.01)

(52) U.S. Cl.
USPC ........... 713/171; 713/168; 709/225; 709/226; 709/227; 709/228; 709/229

(58) Field of Classification Search
USPC .................................................. 713/150, 168
See application file for complete search history.

(56) References Cited

U.S. PATENT DOCUMENTS

| 2002/0102964 | A1* | 8/2002 | Park | 455/411 |
| 2008/0153502 | A1* | 6/2008 | Park et al. | 455/446 |
| 2009/0019284 | A1* | 1/2009 | Cho et al. | 713/170 |

* cited by examiner

*Primary Examiner* — Ghazal Shehni
*Assistant Examiner* — Philip J. Chea
(74) *Attorney, Agent, or Firm* — Jefferson IP Law, LLP

(57) ABSTRACT

Provided is an apparatus and method for updating an Authorization Key (AK) of a mobile station in an idle mode in a wireless communication system. The method includes transmitting a first location update request to a base station, receiving a response to the request from the base station, the response to the first location update request including a NONCE_BS, wherein the NONCE_BS is a random number associated with the base station and used for updating the AK, generating a NONCE_MS, wherein the NONCE_MS is a random number used for updating the AK, generating the AK using the NONCE_BS and the NONCE_MS, transmitting a second location update request to the base station, receiving a response to the second location update request from the base station, the response to the second location update request including the NONCE_BS and the NONCE_MS, and confirming the AK based on the NONCE_BS and the NONCE_MS.

25 Claims, 5 Drawing Sheets

METHOD AND APPARATUS FOR UPDATING AN AUTHORIZATION KEY IN A COMMUNICATION SYSTEM

CROSS-REFERENCE TO RELATED APPLICATION

This application claims the benefit under 35 U.S.C. §119(e) of a U.S. Provisional application filed on Oct. 27, 2009 in the U.S. Patent and Trademark Office and assigned Ser. No. 61/255,348, the entire disclosure of which is hereby incorporated by reference.

BACKGROUND OF THE INVENTION

1. Field of the Invention

The present invention relates to a wireless communication system. More particularly, the present invention relates to an apparatus and method for updating a Pairwise Master Key (PMK)/Authorization Key (AK) of a mobile station in an idle mode in a wireless communication system.

2. Description of the Related Art

A mobile station operating in a wireless communication system utilizes an idle mode in order to reduce power consumption of the mobile station. In addition, use of the idle mode by the mobile station enables resources of the wireless communication system to be more efficiently utilized.

When the mobile station is in the idle mode, context for the mobile station is transferred from a base station to a paging controller, thereby conserving resources of the base station.

Meanwhile, the mobile station possesses an Authorization Key (AK) and an encryption key that are shared with a network through an authorization procedure. The AK and the encryption key are used to facilitate secure communication. For example, the base station uses the AK and the encryption key for the authorization and the encryption of data.

To ensure security of the AK and the encryption key, the PMK/AK is updated before expiration of at least one of a timer and a counter. The timer corresponds to a survival period of the PMK/AK and the encryption key. The counter corresponds to numbers related to the AK and the encryption key.

According to the conventional art, when the mobile station is in the idle mode, the mobile station performs a security key update procedure after completion of a network re-entry procedure in order to update the PMK/AK.

Thereafter, when there is no data to communicate between the mobile station and the base station, the mobile station may perform a procedure to return to the idle mode.

The conventional PMK/AK key update procedure will be described below with reference to FIG. 1.

FIG. 1 illustrates a PMK/AK update procedure of a mobile station in an idle mode in wireless communication system according to the conventional art.

Referring to FIG. 1, when a mobile station 100 is in an idle mode 160 and when an update condition for an AK and an encryption key is satisfied, the mobile station 100 transmits a ranging request message (i.e., an AAI_RNG-REQ message) to a base station 120 to request a network re-entry in step 102.

The base station 120 transmits a context request message (i.e., a Context-REQ message) to a Paging Controller (PC)/authorization station 140 in step 122 to request the network re-entry of the mobile station 100. The PC/authorization station 140 transmits a context response message (i.e., a Context-RSP message) to the base station 120 in step 142 that includes information used for the re-entry of the mobile station 100. The base station completes the network re-entry of the mobile station 100 by transmitting a ranging response message (i.e., an AAI_RNG-RSP message) to the mobile station 100 in the step 126.

After the network re-entry procedure, a key agreement triggering occurs in step 162 triggering the update of the AK for the mobile station 100, the base station 120, and the PC/authorization station 140. The base station 120 transmits a Key Agreement MSG#1 to the mobile station 100 in step 124 and the mobile station 100 transmits a Key Agreement MSG#2 to the base station 120 in step 104.

The base station transmits an AK request message (i.e., an AK-REQ message) to the PC/authorization station 140 in step 128 to request the AK. The PC/authorization station 140 transmits an AK response message (i.e., an AK-RSP message) to the base station 120 in step 144. The base station 120 determines a new AK through a 3-way handshake process by transmitting a Key Agreement MSG#3 message to the mobile station 100 in step 130.

Hereafter, the mobile station 100 may return to idle mode when there is no data to transmit or receive.

However, there are problems with the mobile station performing the network re-entry procedure only to update the AK and then return to the idle mode. For example, power consumption of the mobile station is increased and resources of the base station are wasted.

Therefore, a need exists for an apparatus and method for updating an AK for a mobile station in an idle mode that does not increase power consumption of the mobile station and does not waste resources of the base station.

SUMMARY OF THE INVENTION

An aspect of the present invention is to address at least the above-mentioned problems and/or disadvantages and to provide at least the advantages described below. Accordingly, an aspect of the present invention is to provide an apparatus and method for updating a Pairwise Master Key (PMK)/Authorization Key (AK) of a mobile station in an idle mode in wireless communication system.

Another aspect of the present invention is to provide an apparatus and method for updating a PMK/AK using a location update in a wireless communication system.

Yet another aspect of the present invention is to provide an apparatus and method for updating an AK using ranging messages (i.e., an AAI_RNG-REQ message and an AAI_RNG_RSP message) without using another key agreement process when zone switching is used in a wireless communication system.

In accordance with an aspect of the present invention, a method for operating a mobile station in an idle mode to update a PMK/AK in a wireless communication system is provided. The method includes transmitting a first location update request to a base station, the first location update request including a request for updating a PMK/AK, receiving a response to the first location update request from the base station, the response to the first location update request including a NONCE_BS, wherein the NONCE_BS is a random number associated with the base station and used for updating the PMK, generating a NONCE_MS, wherein the NONCE_MS is a random number used for updating the PMK, generating the PMK/AK using the NONCE_BS and the NONCE_MS, transmitting a second location update request to the base station, the second location update request including the NONCE_BS and the NONCE_MS, receiving a response to the second location update request from the base station, the response to the second location update request including the NONCE_BS and the NONCE_MS, and confirming the PMK/AK based on the NONCE_BS and the NONCE_MS.

In accordance with another aspect of the present invention, a method for operating a base station to update a PMK/AK of a mobile station in an idle mode in a wireless communication system is provided. The method includes receiving a first location update request from a mobile station, the first location update request including a request for updating a PMK, generating a NONCE_BS, wherein the NONCE_BS is a random number used for updating the PMK, transmitting a response to the first location update request, the response to the first location update request including the NONCE_BS, receiving a second location update request from the mobile station, the second location update request including the NONCE_BS and a NONCE_MS, wherein the NONCE_MS is a random number associated with the mobile station and used for updating the PMK, transmitting the NONCE_BS and the NONCE_MS to a Paging Controller (PC)/authorization station, receiving an AK from the PC/authorization station, and transmitting a response to the second location update request, the response to the second location update request including the NONCE_BS and the NONCE_MS.

In accordance with yet another aspect of the present invention, a method for operating a mobile station in an idle mode to update a PMK/AK in a wireless communication system is provided, the method includes acquiring a NONCE_BS, wherein the NONCE_BS is a random number associated with a base station and used for updating the PMK, generating a NONCE_MS, wherein the NONCE_MS is a random number used for updating the PMK, generating the PMK/AK using the NONCE_BS and the NONCE_MS, transmitting a location update request to the base station, the second location update request including the NONCE_BS and the NONCE_MS, receiving a response to the location update request from the base station, the response to the second location update request including the NONCE_BS and the NONCE_MS, and confirming the PMK/AK based on the NONCE_BS and the NONCE_MS.

In accordance with still another aspect of the present invention, a method for operating a base station to update a PMK/AK of a mobile station in an idle mode in a wireless communication system is provided. The method includes receiving a location update request from the mobile station, the second location update request including a NONCE_BS and a NONCE_MS, wherein the NONCE_BS is a random number associated with the base station and used for updating the PMK and the NONCE_MS is a random number generated by the mobile station and used for updating the PMK, transmitting the NONCE_BS and the NONCE_MS to a PC/authorization station, receiving an AK from the PC/authorization station; and transmitting a response to the second location update request, the response to the second location update request including the NONCE_BS and the NONCE_MS In accordance with another aspect of the present invention a method for operating a mobile station in an idle mode to update a PMK/AK in a wireless communication system is provided, the method includes receiving a message indicating that a zone switching is to be performed from a first base station, the message indicating that a zone switching is to be performed including a NONCE_BS, wherein the NONCE_BS is a random number associated with a second base station and used for updating the PMK, generating a NONCE_MS, wherein the NONCE_MS is a random number used for updating the PMK, generating the PMK/AK using the NONCE_BS and the NONCE_MS, transmitting a message for the zone switching to the second base station, the message for the zone switching including the NONCE_BS and the NONCE_MS, receiving a response to the message for the zone switching from the second base station, the response to the message for the zone switching including the NONCE_BS and the NONCE_MS and confirming the PMK/AK based on the NONCE_BS and the NONCE_MS.

In accordance with yet another aspect of the present invention a mobile station apparatus for updating a PMK/AK in an idle mode in a wireless communication system is provided. The apparatus includes a physical layer transmitting unit for transmitting data to a base station, a physical layer receiving unit for receiving data from the base station, and a controller. The controller generates a first location update request, the first location update request including a request for updating a PMK/AK, controls the physical layer transmitting unit to transmit the first location update request to the base station, controls the physical layer receiving unit to receive a response to the first location update request from the base station, the response to the first location update request including a NONCE_BS, wherein the NONCE_BS is a random number associated with the base station and used for updating the PMK, generates a NONCE_MS, wherein the NONCE_MS is a random number used for updating the PMK, generates the PMK/AK using the NONCE_BS and the NONCE_MS, generates a second location update request, the second location update request including the NONCE_BS and the NONCE_MS, controls the physical layer transmitting unit to transmit the second location update request to the base station, controls the physical layer receiving unit to receive a response to the second location update request from the base station, the response to the second location update request including the NONCE_BS and the NONCE_MS, and confirms the PMK/AK based on the NONCE_BS and the NONCE_MS.

In accordance with still another aspect of the present invention a base station apparatus for updating a PMK/AK of a mobile station in an idle mode in a wireless communication system is provided. The apparatus includes a physical layer transmitting unit for transmitting data to a mobile station and for transmitting data to a PC/authorization station, a physical layer receiving unit for receiving data from the mobile station and for receiving data from the PC/authorization station, and a controller. The controller controls the physical layer receiving unit to receive a first location update request from the mobile station, the first location update request including a request for updating a PMK/AK, generates a NONCE_BS, wherein the NONCE_BS is a random number used for updating the PMK, controls the physical layer transmitting unit to transmit a response to the first location update request, the response to the first location update request including the NONCE_BS, controls the physical layer receiving unit to receive a second location update request from the mobile station, the second location update request including the NONCE_BS and a NONCE_MS, wherein the NONCE_MS is a random number associated with the mobile station and used for updating the PMK, controls the physical layer transmitting unit to transmit the NONCE_BS and the NONCE_MS to the PC/authorization station, controls the physical layer receiving unit to receive an AK from the PC/authorization station, and controls the physical layer transmitting unit to transmit a response to the second location update request, the response to the second location update request including the NONCE_BS and the NONCE_MS.

In accordance with another aspect of the present invention a mobile station apparatus for updating a PMK/AK in an idle mode in a wireless communication system. The apparatus includes a physical layer transmitting unit for transmitting data to a base station, a physical layer receiving unit for receiving data from the base station, and a controller. The controller acquires a NONCE_BS, wherein the NONCE_BS is a random number associated with the base station and used for updating the PMK, generates a NONCE_MS, wherein the NONCE_MS is a random number used for updating the PMK, generates the PMK/AK using the NONCE_BS and the NONCE_MS, controls the physical layer transmitting unit to transmit a location update request to the base station, the second location update request including the NONCE_BS and the NONCE_MS, controls the physical layer receiving unit to receive a response to the location update request from the base station, the response to the second location update request including the NONCE_BS and the NONCE_MS, and confirms the PMK/AK based on the NONCE_BS and the NONCE_MS.

In accordance with yet another aspect of the present invention a base station apparatus for updating a PMK/AK of a mobile station in an idle mode in a wireless communication system is provided. The apparatus includes a physical layer transmitting unit for transmitting data to a mobile station and for transmitting data to a PC/authorization station, a physical layer receiving unit for receiving data from the mobile station and for receiving data from the PC/authorization station, and a controller. The controller controls the physical layer receiving unit to receive a location update request from the mobile station, the second location update request including a NONCE_BS and a NONCE_MS, wherein the NONCE_BS is a random number associated with the base station and used for updating the PMK and the NONCE_MS is a random number generated by the mobile station and used for updating the PMK, controls the physical layer transmitting unit to transmit the NONCE_BS and the NONCE_MS to the PC/authorization station, controls the physical layer receiving unit to receive an AK from the PC/authorization station, and controls the physical layer transmitting unit to transmit a response to the second location update request, the response to the second location update request including the NONCE_BS and the NONCE_MS.

In accordance with still another aspect of the present invention a mobile station apparatus for updating a PMK/AK in an idle mode in a wireless communication system is provided. The apparatus includes a physical layer transmitting unit for transmitting data to a first base station and for transmitting data to a second base station, a physical layer receiving unit for receiving data from the first base station and for receiving data from the second base station, and a controller. The controller controls the physical layer receiving unit to receive a message indicating that a zone switching is to be performed from the first base station, the message indicating that a zone switching is to be performed including a NONCE_BS, wherein the NONCE_BS is a random number associated with the second base station and used for updating the PMK, generates a NONCE_MS, wherein the NONCE_MS is a random number used for updating the PMK, generates the PMK/AK using the NONCE_BS and the NONCE_MS, controls the physical layer transmitting unit to transmit a message for the zone switching to the second base station, the message for the zone switching including the NONCE_BS and the NONCE_MS, controls the physical layer receiving unit to receive a response to the message for the zone switching from the second base station, the response to the message for the zone switching including the NONCE_BS and the NONCE_MS, and confirms the PMK/AK based on the NONCE_BS and the NONCE_MS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
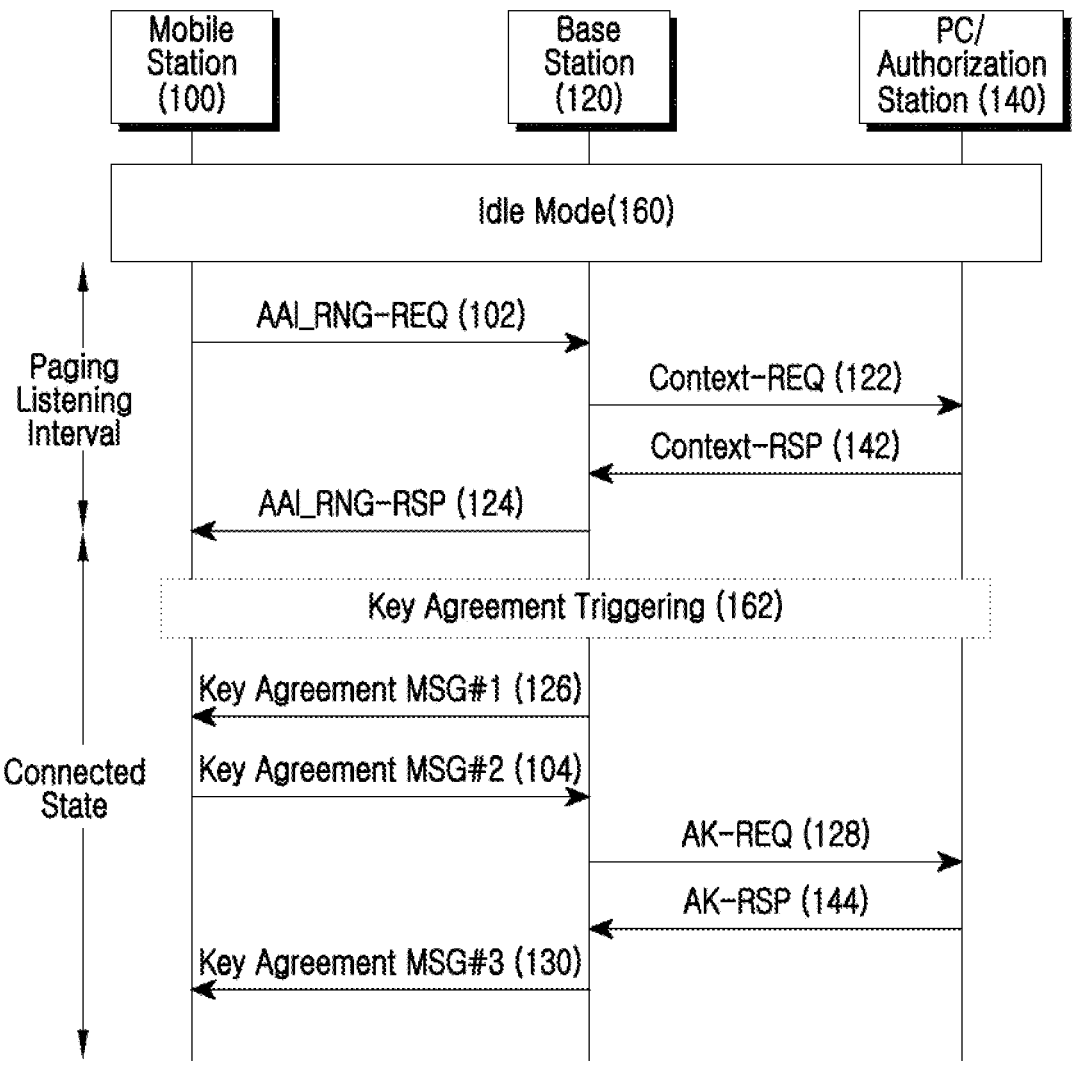
FIG. 1 illustrates a Pairwise Master Key (PMK)/Authorization Key (AK) update procedure of a mobile station in an idle mode in wireless communication system according to the conventional art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include a technique for a mobile station in an idle mode to perform a Pairwise Master Key (PMK)/Authorization Key (AK) update through a location update in a wireless communication system. When the mobile station updates the PMK/AK through a location update process, power consumption of the mobile station and resource consumption of the base station may be reduced.

Exemplary embodiments of the present invention will be described below in the context of a wireless communication system based on an Orthogonal Frequency Division Multiplexing (OFDM)/Orthogonal Frequency Division Multiple Access (OFDMA) as an example. However, the present invention may be equally applied to any other communication system that employs a similar location update. An example of a wireless communication system based on OFDM/OFDMA is a wireless communication system based on an Institute of Electrical and Electronics Engineers (IEEE) 802.16 standard.

Exemplary embodiments of the present invention utilize a ranging request messages (i.e., an AAI_RNG-REQ message and an AAI_RNG-RSP message) instead of a Key Agreement MSG#1, a Key Agreement MSG#2, and a Key Agreement MSG#3 that is employed in the conventional art.

Figure 2:
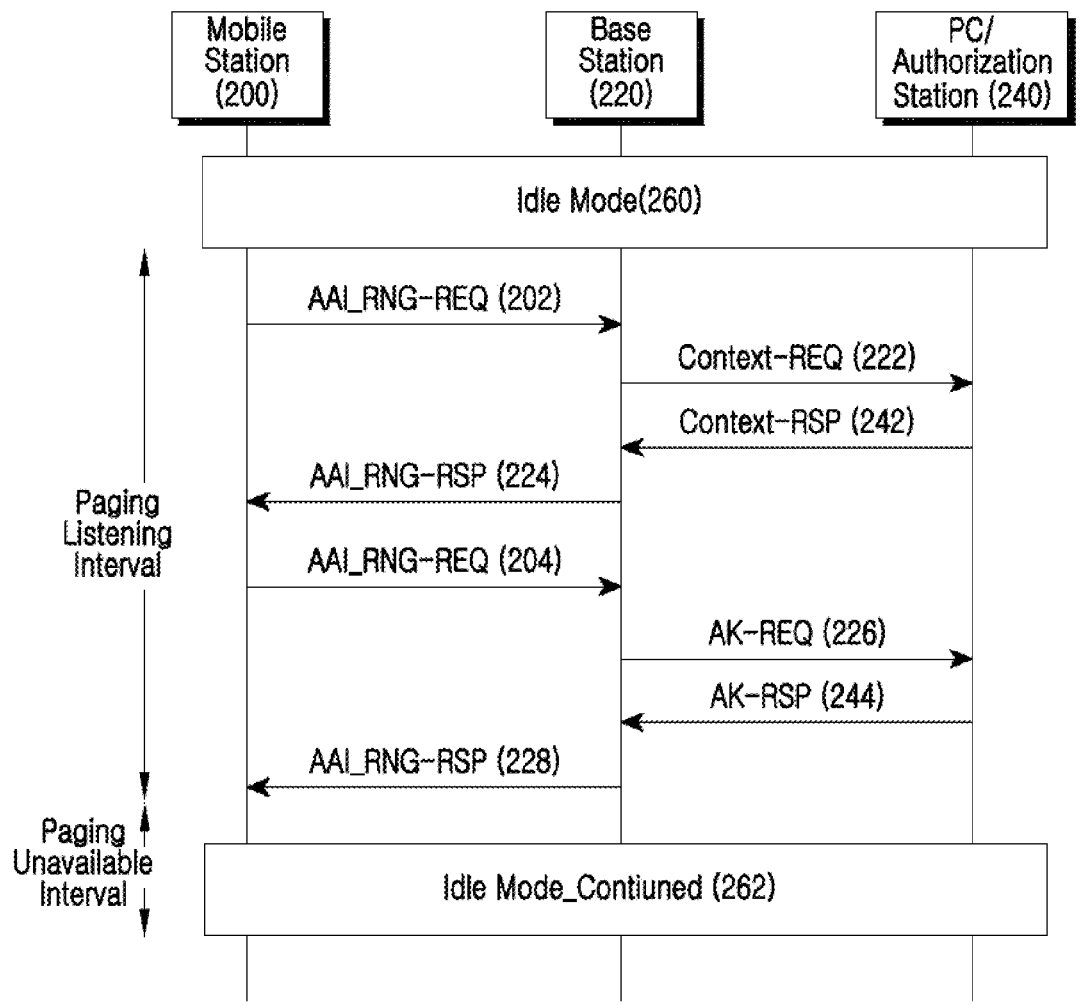
FIG. 2 illustrates a PMK/AK update procedure through a location update process for a mobile station in an idle mode in a wireless communication system according to an exemplary embodiment of the present invention.

FIG. 2 illustrates an AK update procedure through a location update process for a mobile station in an idle mode in a wireless communication system according to an exemplary embodiment of the present invention.

Referring FIG. 2, when a mobile station 200 is in an idle mode in step 260, the mobile station 200 transmits a ranging request message (i.e., an AAI_RNG-REQ message) to a base station 220 in step 202 in order to perform a location update.

The AAI_RNG-REQ message may include information that represents whether the mobile station 200 requests an AK update according to an exemplary embodiment of the present invention.

The base station 220 obtains an AK context in order to determine whether the AAI_RNG-REQ message is valid by transmitting a context request message (i.e., a Context-REQ message) to a (Paging Controller) PC/authorization station 240 in step 222 and receives a context response message (i.e., a Context-RSP message) from the PC/authorization station 240 in step 242.

When the AAI_RNG-REQ message is determined to be valid, the base station 220 generates a NONCE_BS and inserts the NONCE_BS into a ranging response message (i.e., an AAI_RNG-RSP message) that is transmitted to the mobile station 200 in step 224. The NONCE_BS is a random number associated with the base station.

The mobile station 220 generates a Pairwise Master Key (PMK) using a NONCE_MS generated by the mobile station 200 and the NONCE_BS and then generates the AK using the PMK. The mobile station 200 transmits the AAI_RNG-REQ message to the base station 220 in step 204 in order to perform an additional location update. The NONCE_MS is a random number associated with the mobile station.

The base station 220 determines whether the NONCE_BS value is identical to a value included in the AAI_RNG-RS message. If the base station 220 determines that the NONCE_BS value is identical to a value included in the AAI_RNG-RS message, the base station 220 transmits an AK request message (i.e., an AK-REQ message) to the PC/authorization station 240 in step 226 that includes the NONCE_MS and the NONCE_BS.

The base station 220 receives an AK response message (i.e., an AK-RSP message) from the PC/authorization station 240 in step 244 that includes an AK generated by the PO/authorization station 240.

The base station 220 transmits an AAI_RNG-RSP message in step 228 that includes the NONCE_MS and the NONCE_BS.

The mobile station 200 finishes the AK update by confirming the AK using the NONCE_MS and the NONCE_BS and re-enters the idle mode in step 262.

Figure 3:
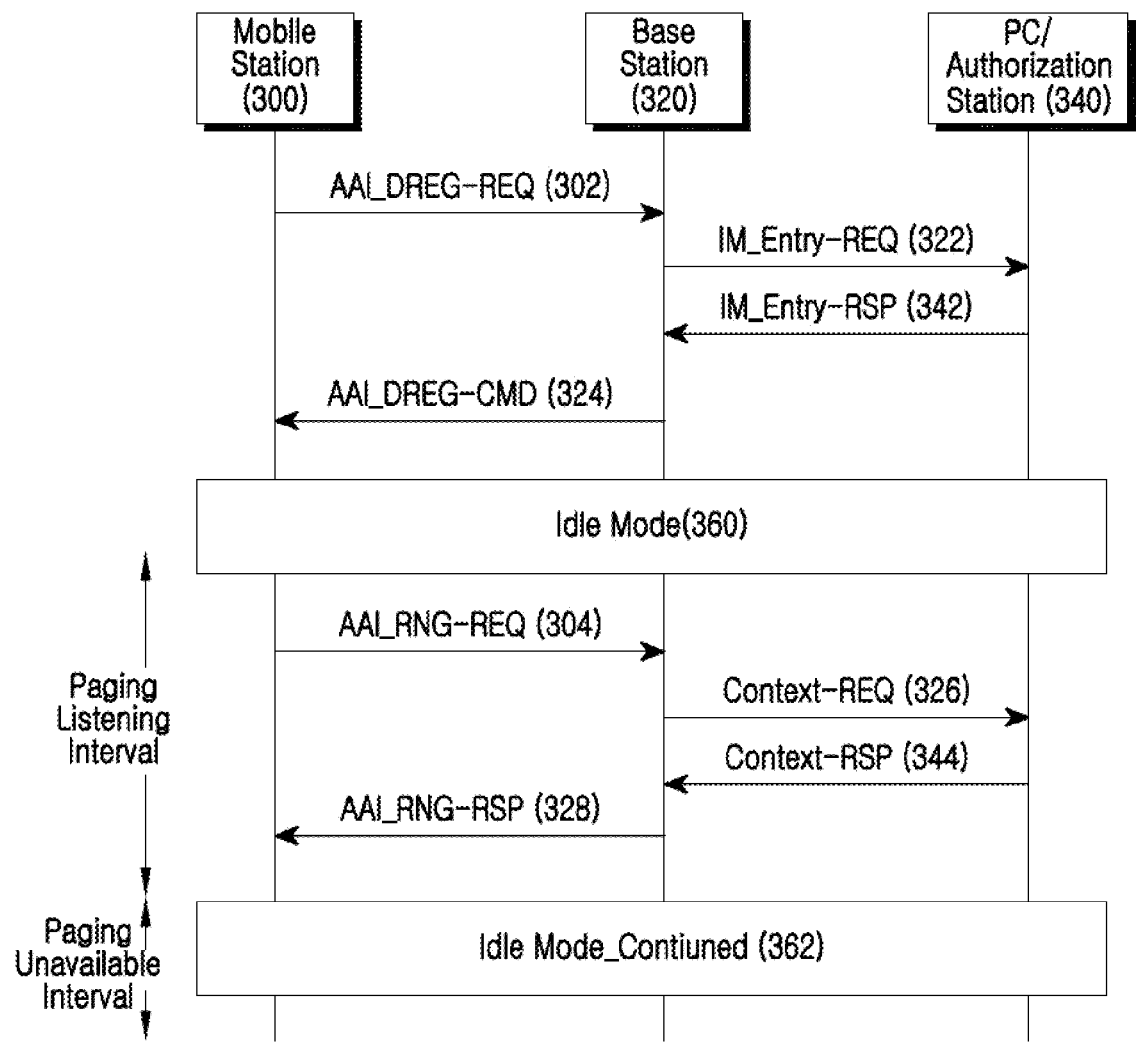
FIG. 3 illustrates a procedure for transitioning to an idle mode and performing a PMK/AK update through a location update for a mobile station in a wireless communication system according to an exemplary embodiment of the present invention.

FIG. 3 illustrates a procedure for transitioning to an idle mode and a procedure for performing an AK update through a location update for a mobile station in a wireless communication system according to an exemplary embodiment of the present invention.

Referring to FIG. 3, a mobile station 300 transmits a deregistration request message (i.e., an AAI_DREG-REQ message) in step 302 in order to request a transition to an idle mode.

A base station 320 transmits an idle mode entry request message (i.e., an IM_Entry-REQ message) to a PC/authorization station 340 in step 322 in order to prepare for the transition of the mobile station 300 to the idle mode. The base station 320 receives an idle mode entry response message (i.e., an IM_Entry-RSP message) from the PC/authorization station 340 in step 342 that includes a NONCE_BS for the mobile station 300 to use in an AK update in the idle mode.

The base station 320 transmits a deregistration command message (i.e., an AAI_DREG-CMD message) to the mobile station 300 in step 324 that includes the NONCE_BS. Thereafter, the mobile station 300 transitions into the idle mode in step 360.

Alternatively, according to an exemplary embodiment of the present invention, the NONCE_BS may be generated by using a NONCE_BS shared through a recent key agreement and by using a Degeneration ID allocated to the mobile station 300 during a transition process to the idle mode. For example, when "NONCE_BS=current NONCE_BS XOR (Deregistration IDentifier (ID)| zero padding" is satisfied, the NONCE_BS may not be transferred to the mobile station 300 through the AAI_DREG-CMD message in step 324.

When the mobile station 300 determines it is to perform an AK update while in the idle mode in step 360, the mobile station 300 generates a PMK using a NONCE_MS generated by the mobile station 300 and the NONCE_BS and then generates the AK using the PMK.

The mobile station 300 transmits an AAI_RNG-REQ message to the base station 320 in step 304 in order to perform a location update. The AAI_RNG-REQ message transmitted by the mobile station 300 in step 304 includes the NONCE_MS and the NONCE_BS.

The base station 320 determines if the NONCE_BS value included in the AAI_RNG-REQ message is identical to the NONCE_BS value included in the AAI_DREG-CMD message. If the base station 320 determines that the NONCE_BS value included in the AAI_RNG-REQ message is identical to the NONCE_BS value included in the AAI_DREG-CMD message, the base station 320 transmits the NONCE_MS and the NONCE_BS in a Context-REQ message to the PC/Authorization station 340 in step 326. The base station 320 receives a Context-RSP message from the PC/Authorization station 340 in step 344 that includes an AK generated by the PC/Authorization station 340.

The base station 320 transmits an AAI_RNG-RSP message to the mobile station 300 in step 328. The AAI_RNG-RSP message includes the NONCE_MS and the NONCE_BS.

The mobile station 300 finishes the AK update procedure by confirming the AK using NONCE_MS and the NONCE_BS and returns to the idle mode in step 362.

Figure 4:
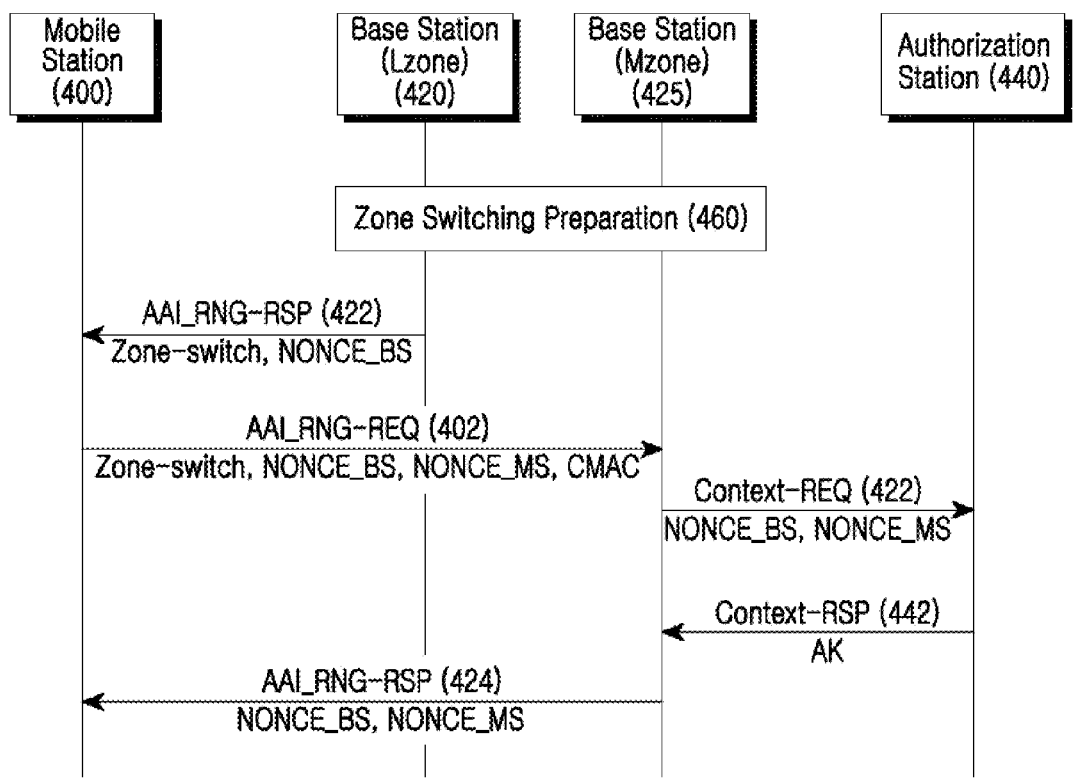
FIG. 4 illustrates a PMK/AK update procedure with a zone switching from an Institute of Electrical and Electronics Engineers (IEEE) 802.16e legacy zone to an IEEE 802.16m zone in a wireless communication system according to an exemplary embodiment of the present invention; and, FIG. 5 illustrates a block diagram of a base station and a mobile station in a wireless communication system according to an exemplary embodiment of the present invention.

FIG. 4 illustrates an AK update procedure with a zone switching from an IEEE 802.16e legacy zone to an IEEE 802.16m zone in a wireless communication system according to an exemplary embodiment of the present invention.

Referring to FIG. 4, an IEEE 802.16e legacy zone and an IEEE 802.16m zone will described hereafter as being serviced by a base station (Lzone) 420 and a base station (Mzone) 425, respectively, as an example. However, the IEEE 802.16e zone and the IEEE 802.16m zone may be serviced by the same base station. The base station 420 of the IEEE 802.16e zone, with which a mobile station 400 has an active connection, performs a zone switching preparation procedure in step 460 with the base station 425 of the IEEE 802.16m zone.

The base station 420 of the IEEE 802.16e zone transmits an AAI_RNG-RSP message to the mobile station 400 in step 422 to initiate the zone switching. Included in the AAI_RNG-RSP message is a NONCE_BS used in order to update an AK.

The mobile station 400 generates a NONCE_MS and uses the NONCE_MS and the NONCE_BS received in AAI_RNG-RSP message to generate a new PMK and generate an AK from the PMK.

The mobile station 400 attempts to perform zone switching by transmitting an AAI_RNG-REQ message to base station 425 of the IEEE 802.16m zone in step 402. The NONCE_BS and NONCE_MS are included in the AAI_RNG-REQ message in step 402 and the NONCE_BS and NONCE_MS are transmitted together for a network to generate an identical AK and a Cipher-based Message Authentication Code (CMAC), which is generated by using a new CMAC key generated from the new AK.

The base station 425 of the IEEE 802.16m zone transmits a Context-REQ message to a Authorization station 440 in step 422 to request a new AK. The Authorization station 440 generates a new PMK and generates an AK from the PMK.

The base station 425 of the IEEE 802.16m zone receives a Context-RSP message from the Authorization station 440 in step 442 that includes the AK. The base station 425 of the IEEE 802.16m zone generates a CMAC key and authorizes the AAI_RNG-REQ message received from the mobile station 400 at step 402.

When the authorization is successful, the base station 425 of the IEEE 802.16m zone transmits an AAI_RNG-RSP message to the mobile station 400 in step 424 in response to the AAI_RNG-REQ message received at step 402 and completes the zone switching.

The AAI_RNG-RSP message transmitted at step 424 includes the NONCE_BS and the NONCE_MS and is encrypted by using a Traffic Encryption Key (TEK) that is generated from the new AK. The AAI_RNG-RSP message denotes a successful completion of the AK update to the mobile station 400.

Figure 5:
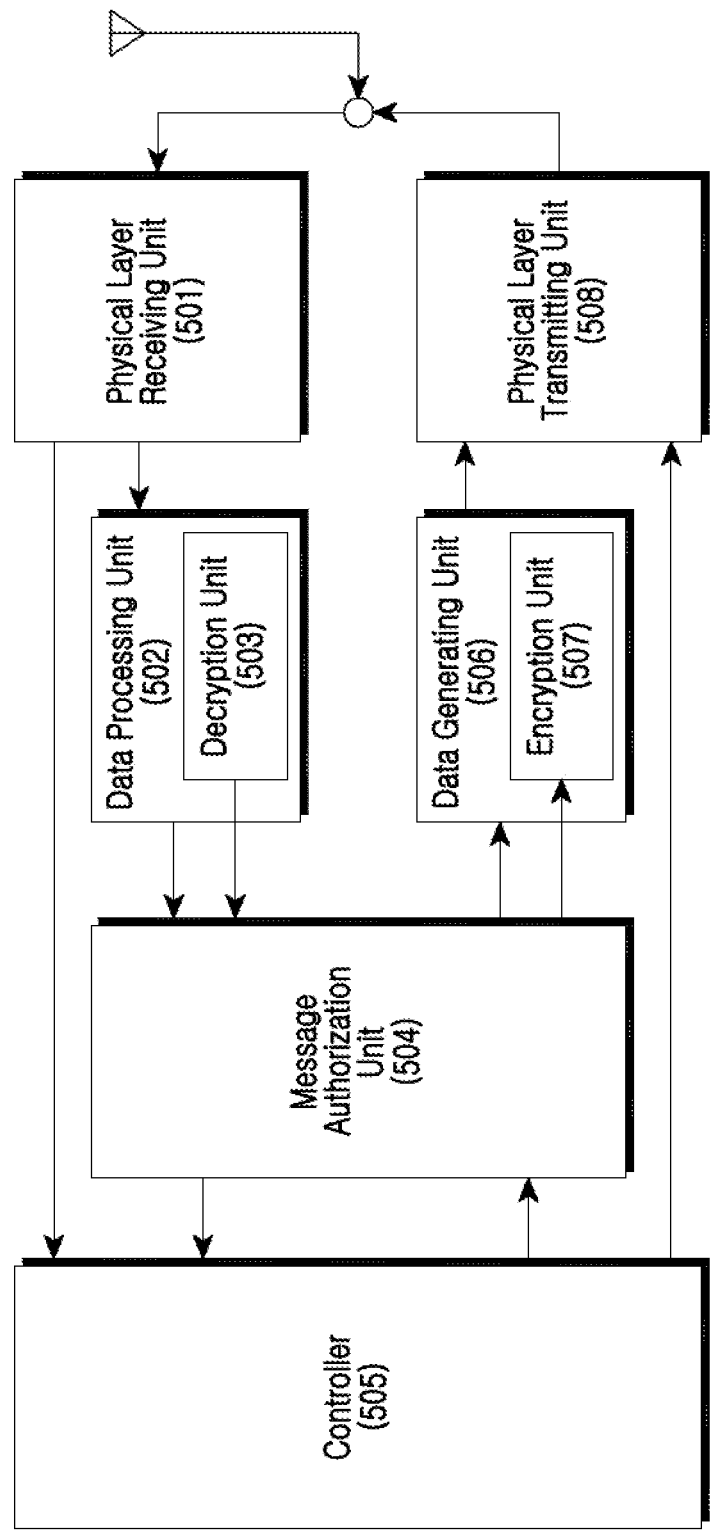

FIG. 5 illustrates a block diagram of a base station and a mobile station in a wireless communication system according to an exemplary embodiment of the present invention.

The base station and the mobile station according to exemplary embodiments of the present invention may have substantially identical configurations. Therefore, FIG. 5 is referred to hereafter to explain the configuration of both the base station and the mobile station.

Referring to FIG. 5, the base station and the mobile station may each comprise a physical layer receiving unit 501, a data processing unit 502, a message authorization unit 504, a controller 505, a data generating unit 506 and a physical layer transmitting unit 508.

The data processing unit 502 includes a decryption unit 503 and the data generating unit 506 includes an encryption unit 507.

The physical layer receiving unit 501 provides received control information to the controller 505. In addition, the physical layer receiving unit 501 provides data to the data processing unit 502 in order to detect packets (i.e., a MAC-Packet Data Unit (PDU)) from the received data.

The data processing unit 502 detects packets (i.e., a MAC-PDU) from the received data, determines whether the packets are control messages, and determines whether the packets are encrypted based on header information.

When the packets are encrypted control messages, the data processing unit 502 performs an authorization of the packets by checking an Integrity Check Value (ICV) using the decryption unit 503. When the authorization fails, packets related to the failed authorization are discarded. When the authorization is successful, packets related to the successful authorization are decrypted and are provided to the message authorization unit 504 after control messages are extracted.

However, when the packets are not encrypted control messages, the data processing unit 502 extracts control messages from the packets and provides the extracted control messages to the message authorization unit 504.

When the control messages are provided from the decryption unit 503, the message authorization unit 504 determines if the control messages are valid and provides the control messages determined to be valid to the controller 505.

When control messages are not provided from the decryption unit 503, the message authorization unit 504 performs an authorization by determining a CMAC included in the control message. Herein, a control message for which authorization fails is discarded.

Meanwhile, the controller 505 provides control information to a base station through the physical layer transmitting unit 508 and the controller 505 provides other control information to the message authorization unit 504.

When a message authorization (e.g., a CMAC) is required according to a desired protection level, CMAC tuples are inserted into the control message and the control message is provided to the data generating unit 506. The data generating unit 506 transmits unencrypted packets to the base station through the physical layer transmitting unit 508.

When encryption is required according to a desired protection level of the control message, the control message is provided to the data generating unit 506 and the encryption unit 507 encrypts the control message into a packet with an encryption scheme (i.e., Advanced Encryption Standard (AES) Counter with Cipher Block Chaining-Message Authentication Code (CBC-MAC) (AES-CCM)) that has an encryption and an authorization function. The encrypted packet is transmitted to the base station through the physical layer transmitting unit 508.

Operations of the mobile station and the base station illustrated in FIG. 5 will be described below with reference to FIG. 4.

First, operation of the mobile station illustrated in FIG. 5 will be described below with reference to FIG. 4.

When a mobile station in an idle mode is to perform an AK update, the mobile station obtains physical layer information needed for communication with the base station during a paging listening interval. Hereafter, the mobile station transmits a ranging code to a ranging area through the physical layer transmitting unit 508.

The controller 505 waits for uplink resource allocation information received through the physical layer receiving unit 501.

When the uplink resource allocation information is received, the controller 505 generates a ranging request message (i.e., an AAI_RNG-REQ message) and transfers the AAI_RNG-REQ message to the message authorization unit 504.

The message authorization unit 504 generates a CMAC and inserts CMAC tuples into the AAI_RNG-REQ message and transfers the AAI_RNG-REQ message to the data generating unit 506.

The data generating unit 506 transmits the ranging request message as unencrypted packets to the base station through the physical layer transmitting unit 508.

The AAI_RNG-REQ message includes an AK update request. After transmitting the AAI_RNG-REQ message, the physical layer receiving unit 501 transfers received data to the data processing unit 502 and the data processing unit 502 detects packets (i.e., a MAC PDU) from the received data and determines whether the packets are control messages and are encrypted based on header information.

When the packets are encrypted control messages, the data processing unit 502 performs an authorization of the packets (i.e., by checking an ICV) using the decryption unit 503. When the authorization fails, packets related to the failed authorization are discarded. When the authorization is successful, packets related to the successful authorization are decrypted and are provided to the message authorization unit 504.

However, when the packets are not encrypted control messages, the data processing unit 502 extracts control messages from the packets and provides the extracted control messages to the message authorization unit 504.

When the control messages are provided from the decryption unit 503 the message authorization unit 504 determines the control messages to be valid and provides the control messages to the controller 505.

When, a control message is a network re-entry direction message, the controller 505 lets the mobile station perform the network re-entry procedure including an authorization.

When a control message transferred through the decryption unit 503 is an AAI_RNG-RSP message and when the ranging response message includes a NONCE_BS, the mobile station generates a PMK using the NONCE_BS and a NONCE_MS generated by the mobile station and then generates an AK from the PMK.

The controller 505 generates an AAI_RNG-REQ message and transfers the AAI_RNG-REQ message to the message authorization unit 504. The message authorization unit 504 generates a CMAC and inserts CMAC tuples into the AAI_RNG-REQ message and transfers the AAI_RNG-REQ message to the data generating unit 506.

The data generating unit 506 transfers the AAI_RNG-REQ message as unencrypted packets to the base station through the physical layer transmitting unit 508. The AAI_RNG-REQ message includes the NONCE_MS and the NONCE_BS.

When a control message is an AAI_RNG-RSP message through the decryption unit 503 and when the AAI_RNG-RSP message includes the NONCE_MS and the NONCE_BS, the AK update procedure is completed and the mobile station enters into a paging unavailable interval.

Next, an operation of the base station will be explained.

The controller 505 receives a ranging code transmitted from the mobile station through the physical layer receiving unit 501 and the controller 505 allocates uplink resources to transmit an AAI_RNG-REQ message by the mobile station.

Hereafter, when the AAI_RNG-REQ message transmitted from the mobile station is transferred to the message authorization unit 504 through the physical layer receiving unit 501 and the data processing unit 502, the message authorization unit 504 requests AK information, etc., and receives this information from a PC/authorization station in order to authorize the mobile station.

The message authorization unit 504 generates a CMAC using the AK information transmitted from the PC/authorization station and authorizes the AAI_RNG-REQ message.

The AAI_RNG-REQ message which is authorized is transferred to the controller 505. The controller 505 generates the AAI_RNG-RSP message in response to the AAI_RNG-REQ message and transfers the AAI_RNG-RSP message to the message authorization unit 504.

The mobile station and the base station share Traffic Encryption Key (TEK) generation parameters thereby making it possible to perform encryption. Thus, the AAI_RNG-RSP message is encrypted by an encryption scheme (i.e., AES-CCM) which has an encryption function and an authorization function through the encryption unit 507 in the data processing unit 506. The encrypted AAI_RNG-RSP message is transferred to the mobile station through the physical layer transmitting unit 508.

When a location update and an AK update are needed for the AAI_RNG-REQ message or when the AK update is needed, the base station performs the AK update by including the NONCE_BS when transmitting the AAI_RNG-RSP message.

When the AAI_RNG-REQ message including the NONCE_BS and a NONCE_MS is received from the mobile station, the base station transfers the NONCE_BS and a NONCE_MS to the PC/authorization station and receives an AK in response to the NONCE_BS and the NONCE_MS.

The message authorization unit 504 generates a CMAC by using the AK, etc., from the PC/authorization station and performs an authorization for the AAI_RNG-REQ message.

The message authorization unit 504 transfers the authorized AAI_RNG-REQ message to the controller 505. The controller 505 generates the AAI_RNG-RSP message including the NONCE_BS and the NONCE_MS in response to the authorized AAI_RNG-REQ message and transfers the AAI_RNG-RSP message to the message authorization unit 504. The message authorization unit 504 transfers the AAI_RNG-RSP message to the physical layer transmitting unit 508 through the encryption unit 507 and the physical layer transmitting unit 508 transmits the AAI_RNG-RSP message as packets to the mobile station.

Accordingly, in exemplary embodiments of the present invention, when an AK is to be updated for a mobile station in idle mode, power consumption of the mobile station and resource consumption of a base station may be reduced by performing the AK update without the mobile station leaving an idle mode.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a mobile station in an idle mode to update a Pairwise Master Key (PMK)/Authorization Key (AK) in a wireless communication system, the method comprising:

transmitting a first location update request to a base station, the first location update request including a request for updating the PMK/AK;

receiving a first response to the first location update request from the base station, the first response to the first location update request including a NONCE_BS, wherein the NONCE_BS is a random number associated with the base station and used for updating the PMK of the PMK/AK;

generating a NONCE_MS, wherein the NONCE_MS is a random number used for updating the PMK;

generating the PMK/AK using the NONCE_BS and the NONCE_MS;

transmitting a second location update request to the base station, the second location update request including the NONCE_BS and the NONCE_MS;

receiving a second response to the second location update request from the base station, the second response to the second location update request including the NONCE_BS and the NONCE_MS; and confirming the PMK/AK based on the NONCE_BS and the NONCE_MS.

2. The method of claim 1, wherein the first and second location update requests are included in AAI_RNG-REQ messages, and wherein the first and second responses to the first and second location update requests are included in AAI_RNG-RSP messages, and wherein the AAI_RNG-REQ messages are ranging request messages and the AAI_RNG-RSP messages are ranging response messages.

3. The method of claim 1, wherein the generating of the PMK/AK comprises:

generating the PMK using the NONCE_BS and the NONCE_MS; and generating the AK using the PMK.

4. A method for operating a base station to update a Pairwise Master Key (PMK)/Authorization Key (AK) of a mobile station in an idle mode in a wireless communication system, the method comprising:

receiving a first location update request from the mobile station, the first location update request including a request for updating the PMK/AK;

generating a NONCE_BS, wherein the NONCE_BS is a random number used for updating the PMK;

transmitting a first response to the first location update request, the first response to the first location update request including the NONCE_BS;

receiving a second location update request from the mobile station, the second location update request including the NONCE_BS and a NONCE_MS, wherein the NONCE_MS is a random number associated with the mobile station and used for updating the PMK;

transmitting the NONCE_BS and the NONCE_MS to a Paging Controller (PC)/authorization station;

receiving the AK from the PC/authorization station; and transmitting a second response to the second location update request, the second response to the second location update request including the NONCE_BS and the NONCE_MS.

5. The method of claim 4, wherein the generating of the NONCE_BS comprises:

determining if the first location update request is valid; and if the first location update request is determined to be valid, generating the NONCE_BS.

6. The method of claim 5, wherein the determining if the first location update request is valid comprises:

transmitting a request for an AK context to the PC/authorization station;

receiving the AK context from the PC/authorization station; and determining if the first location update request is valid based on the AK context.

7. The method of claim 4, wherein the transmitting of the NONCE_BS and the NONCE_MS to the PC/authorization station comprises:

determining if the NONCE_BS received in the second location update request is identical to the NONCE_BS transmitted in the first response to the first location update request; and if the NONCE_BS received in the second location update request is determined to be identical to the NONCE_BS transmitted in the first response to the first location update request, transmitting the NONCE_BS and the NONCE_MS to the PC/authorization station.

8. A method for operating a mobile station in an idle mode to update a Pairwise Master Key (PMK)/Authorization Key (AK) in a wireless communication system, the method comprising:

acquiring a NONCE_BS, wherein the NONCE_BS is a random number associated with a base station and used for updating the PMK;

generating a NONCE_MS, wherein the NONCE_MS is a random number used for updating the PMK;

generating the PMK/AK using the NONCE_BS and the NONCE_MS;

transmitting a location update request to the base station, the location update request including the NONCE_BS and the NONCE_MS;

receiving a response to the location update request from the base station, the response to the location update request including the NONCE_BS and the NONCE_MS; and confirming the PMK/AK based on the NONCE_BS and the NONCE_MS.

9. The method of claim 8, wherein the location update request is included in an AAI_RNG-REQ message, and wherein the response to the location update request is included in an AAI_RNG-RSP message, and wherein the AAI_RNG-REQ messages are ranging request messages and the AAI_RNG-RSP messages are ranging response messages.

10. The method of claim 8, wherein the generating of the PMK/AK comprises:

generating the PMK using the NONCE_BS and the NONCE_MS; and generating the AK using the PMK.

11. The method of claim 8, wherein the acquiring of the NONCE_BS comprises:

transmitting a request to transition to the idle mode to the base station;

receiving a response to the request to transition to the idle mode from the base station, the response to the request to transition to the idle mode including the NONCE_BS; and transitioning to the idle mode.

12. The method of claim 8, wherein the acquiring of the NONCE_BS comprises determining the NONCE_BS using a current NONCE_BS used in a previous AK update and a Degeneration IDentifier (DID) allocated to the mobile station during a transition to the idle mode.

13. The method of claim 12, wherein the NONCE_BS is determined using the equation, NONCE_BS=current NONCE_BS XOR(Deregistration ID|zero padding).

14. A method for operating a base station to update a Pairwise Master Key (PMK)/Authorization Key (AK) of a mobile station in an idle mode in a wireless communication system, the method comprising:
receiving a location update request from the mobile station, the location update request including a NONCE_BS and a NONCE_MS, wherein the NONCE_BS is a random number associated with the base station and used for updating the PMK and the NONCE_MS is a random number generated by the mobile station and used for updating the PMK;
transmitting the NONCE_BS and the NONCE_MS to a Paging Controller (PC)/authorization station;
receiving the AK from the PC/authorization station; and
transmitting a first response to the location update request, the first response to the location update request including the NONCE_BS and the NONCE_MS.

15. The method of claim 14, further comprising:
receiving a request to transition to the idle mode from the mobile station;
transmitting an idle mode entry request to the PC;
receiving a second response to the idle mode entry request from the PC, the second response to the idle mode entry request including the NONCE_BS, wherein the NONCE_BS is a random number used for updating the PMK; and
transmitting a third response to the request to transition to the idle mode to the mobile station, the third response to the request to transition to the idle mode including the NONCE_BS.

16. The method of claim 14, wherein the transmitting of the NONCE_BS and the NONCE_MS to the PC/authorization station comprises:
determining if the NONCE_BS received in the location update request is identical to the NONCE_BS transmitted in the third response to the request to transition to the idle mode; and
if the NONCE_BS received in the location update request is determined to be identical to the NONCE_BS transmitted in the third response to the request to transition to the idle mode, transmitting the NONCE_BS and the NONCE_MS to the PC/authorization station.

17. A method for operating a mobile station to update a Pairwise Master Key (PMK)/Authorization Key (AK) during a zone switching in a wireless communication system, the method comprising:
receiving a first message indicating that the zone switching is to be performed from a first base station, the first message indicating that the zone switching is to be performed including a NONCE_BS, wherein the NONCE_BS is a random number associated with a second base station and used for updating the PMK;
generating a NONCE_MS, wherein the NONCE_MS is a random number used for updating the PMK;
generating the PMK/AK using the NONCE_BS and the NONCE_MS;
transmitting a second message for the zone switching to the second base station, the second message for the zone switching including the NONCE_BS and the NONCE_MS;
receiving a response to the second message for the zone switching from the second base station, the response to the second message for the zone switching including the NONCE_BS and the NONCE_MS; and
confirming the AK based on the NONCE_BS and the NONCE_MS.

18. The method of claim 17, wherein the second message for the zone switching includes an AAI_RNG-REQ message, and wherein the first message indicating that the zone switching is to be performed and the response to the message for the zone switching are included in AAI_RNG-RSP messages, and
wherein the AAI_RNG-REQ messages are ranging request messages and the AAI_RNG-RSP messages are ranging response messages.

19. The method of claim 17, wherein the generating of the PMK/AK comprises:
generating the PMK using the NONCE_BS and the NONCE_MS; and
generating the AK using the PMK.

20. The method of claim 17, wherein the second message for the zone switching transmitted to the second base station includes a Cipher-based Message Authentication Code (CMAC) based on a newly generated AK.

21. The method of claim 17, wherein the response to the second message for the zone switching received from the second base station is encrypted using a Traffic Encryption Key (TEK) based on a newly generated AK.

22. A method for operating a base station to update a Pairwise Master Key (PMK)/Authorization Key (AK) during a zone switching in a wireless communication system, the method comprising:
generating a NONCE_BS which is a random number associated with a second base station and used for updating the PMK of the PMK/AK;
transmitting a first message indicating that the zone switching is to be performed in a first base station, the first message indicating that the zone switching is to be performed including the NONCE_BS;
receiving a second message for a zone switching request containing a NONCE_MS and the NONCE_BS from a mobile station;
transmitting the NONCE_BS and the NONCE_MS to an authorization station;
receiving the AK of the PMK/AK from the authorization station; and
transmitting a response to the zone switching request in the second base station, the response to the zone switching request including the NONCE_BS and the NONCE_MS.

23. The method of claim 22, wherein the first message indicating that the zone switching is to be performed including the NONCE_BS, wherein the NONCE_BS is a random number associated with the second base station and used for updating the PMK.

24. The method of claim 22, wherein the second base station transmits the NONCE_BS and the NONCE_MS to the authorization station,
receiving the AK from the authorization station;
transmitting the response to the zone switching request, the response to the zone switching request including the NONCE_BS and the NONCE_MS; and
generating the AK by generating the PMK using the NONCE_BS and the NONCE_MS and generating the AK using the PMK.

25. The method of claim 22, wherein the second message for the zone switching is received including a Cipher-based Message Authentication Code (CMAC) based on a newly generated AK.

* * * * *